(No Model.)
H. A. GRAETER.
WIRE FASTENER.
No. 350,241. Patented Oct. 5, 1886.
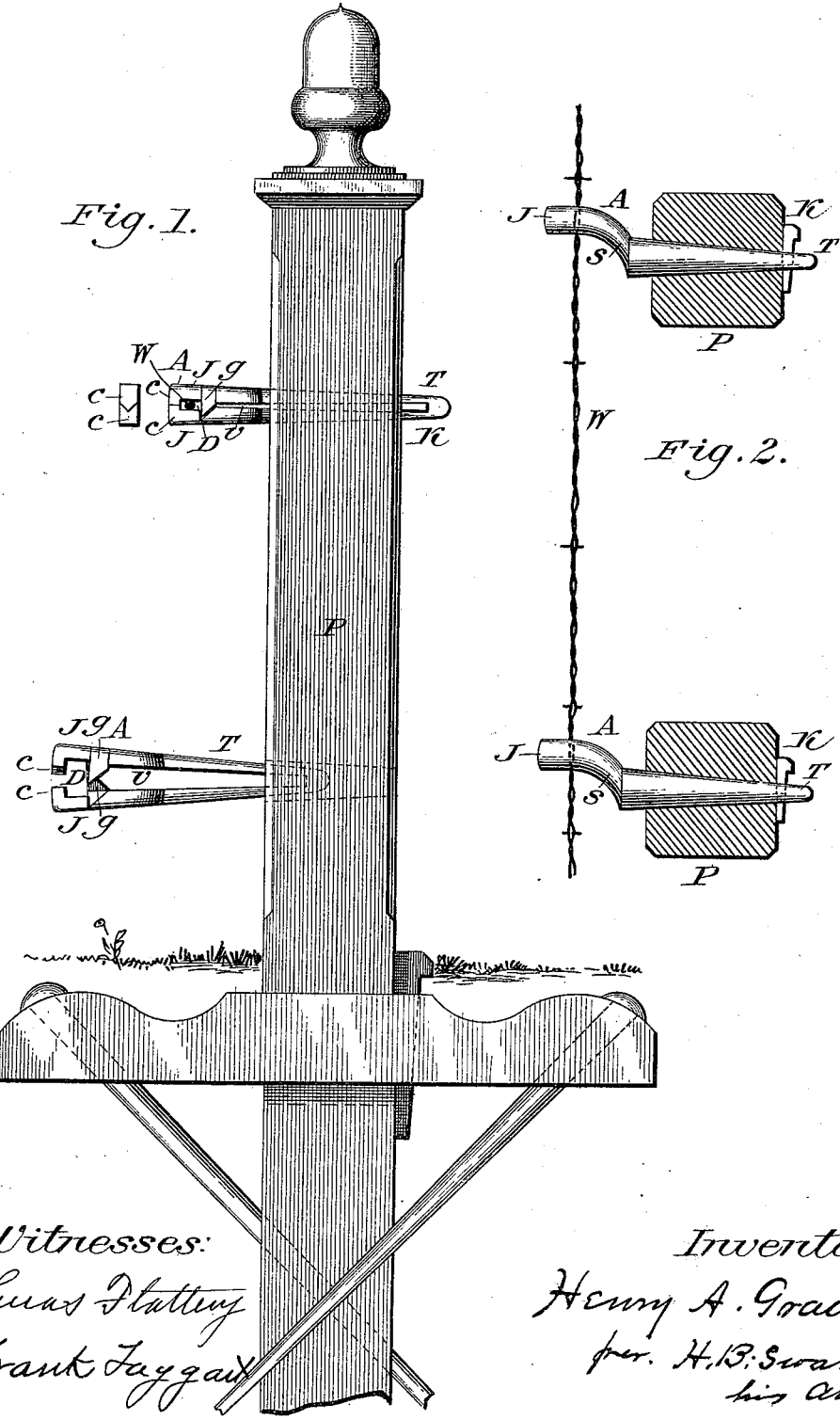
Witnesses:
Lucas Flattery
Frank Faggatt
Inventor:
Henry A. Graeter
per. H. B. Swartz
his Atty

United States Patent Office.

HENRY A. GRAETER, OF WOOSTER, OHIO.

WIRE-FASTENER.

SPECIFICATION forming part of Letters Patent No. 350,241, dated October 5, 1886.

Application filed September 21, 1885. Serial No. 177,697. (No model.)

*To all whom it may concern:*

Be it known that I, HENRY A. GRAETER, a citizen of the United States, residing at Wooster, in the county of Wayne and State of Ohio, have invented a new and useful Barbed-Wire Fastener, of which the following is a specification.

My invention relates to fasteners for securing barbed wire upon iron fence-posts.

Its object is to provide for securing ordinary barbed wire upon wire-posts of small diameter without any interference by reason of the barbs upon the wire, and so that the fasteners may be readily unclamped and the wire removed from the post when desired.

It consists, mainly, of two similar coacting parts separated by a slot, except at one end, which tapers toward a point, where they are united in one. The open end constitutes jaws provided with suitable fangs for securing the wire between them. The united end, which enters a suitable hole in the post, is tapered in the form of a tang, whereby the jaws are drawn together as the device is forced into the hole. The jaws and tang are connected together by a curved shank or neck, which places the jaws at one side of the line of the hole in the post.

The nature and object of my invention are illustrated by the accompanying drawings, in which—

Figure 1 is a view of a section of a post having fasteners embodying my invention, one secured in the post and the other just entering it. Fig. 2 is a horizontal sectional view of the same, showing how interference with the barbs is avoided.

Referring to the drawings, P is an iron fence-post of small diameter, which is secured in the earth by suitable devices. It is perforated at suitable intervals with holes in line above each other to receive the tapered tang T of the fastener A, the holes being preferably tapered to correspond with the form of the tang.

J are the jaws of my fastener. They are each provided with coacting teeth $c$ and flange $g$, the latter being made of sufficient length to prevent the wire from entering the slot $v$, which extends between the opposite parts of the fastener. These teeth and fangs are so situated that when the jaws J are closed a throat, D, is formed, within which the barbed wire W is firmly secured. The front parts of the jaws are also matched longitudinally with tongue and groove to prevent any lateral movement of either jaw from the other. The head thus formed is connected with a curved shank or neck, $s$, which unites with the tapered tang T in line with the head. This tapered tang being slotted throughout, as aforesaid, the jaws J are drawn together upon the wire by forcing the tang into the smaller hole in the post, and the fastener may be there secured by passing a key, $k$, through the portion of the slot $v$ exposed beyond the post, as shown. By means of the bent shank the jaws J are thrown at one side of the line of the hole in the post, and thus all interference with barbs coming in front of the hole is avoided.

I use posts preferably of hollow iron, and make the tangs T preferably conical in shape; but a pyramidal form with hole to correspond would serve the same purpose. Fasteners of like description may also be used in wooden posts, and in such case the key $k$ is not required. It will be seen that by withdrawing the $k$ the fastener may be readily withdrawn and the wire be disengaged from the posts.

Having thus fully described my invention, what I claim as new, and desire to secure by Letters Patent, is—

The barbed-wire fastener A, consisting of opposite jaws, J, having teeth, the bent shank $s$, and tapered tang T, said jaws, shank, and tang divided longitudinally by the slot $v$, and united at the point of the tang to receive the key $k$, substantially as shown and described, and for the purpose specified.

In testimony whereof I hereunto set my hand in presence of two witnesses.

HENRY A. GRAETER.

Witnesses:
ANNA M. GRAETER,
H. B. SWARTZ.